United States Patent [19]
Rahnema

[11] Patent Number: 5,465,253
[45] Date of Patent: Nov. 7, 1995

[54] METHOD AND APPARATUS FOR DEMAND-ASSIGNED REDUCED-RATE OUT-OF-BAND SIGNALING CHANNEL

[75] Inventor: Moe Rahnema, Chandler, Ariz.

[73] Assignee: Motorola, Inc., Schaumburg, Ill.

[21] Appl. No.: 412,506

[22] Filed: Mar. 29, 1995

Related U.S. Application Data

[63] Continuation of Ser. No. 177,025, Jan. 4, 1994, abandoned.

[51] Int. Cl.6 .............................. H04J 3/12; H04B 7/00; H04M 11/06
[52] U.S. Cl. ...................... 370/68.1; 370/94.2; 370/95.1; 370/110.1; 379/63; 379/89
[58] Field of Search .............................. 370/58.1, 60, 61, 370/66, 68, 68.1, 79, 80, 85.7, 94.1, 94.2, 95.1, 95.3, 110.1, 111, 112; 379/58, 63, 67, 88, 89; 340/825.03, 825.06, 825.44

[56] References Cited

U.S. PATENT DOCUMENTS

| | | | |
|---|---|---|---|
| 4,445,213 | 4/1984 | Baugh et al. | 370/94.2 |
| 4,516,239 | 5/1985 | Maxemchuk | 370/85.3 |
| 4,520,477 | 5/1985 | Wen | 370/110.1 |
| 4,763,317 | 8/1988 | Lehman et al. | 370/60 |
| 4,914,650 | 4/1990 | Sriram | 370/94.1 |
| 4,942,570 | 7/1990 | Kotzin et al. | 370/110.1 |
| 4,972,506 | 11/1990 | Uddenfeldt | 370/95.3 |
| 5,197,125 | 3/1993 | Engel et al. | 370/95.3 |

Primary Examiner—Alpus Hsu
Attorney, Agent, or Firm—Kevin K. Johanson; Walter W. Nielsen

[57] ABSTRACT

In a radio frequency communications system transmitting and receiving packetized voice information over a limited number of channels, certain time slots are preempted for signaling information. This is accomplished by providing a set of channels which are logically defined and multiplexed onto the voice traffic channels by stealing a voice packet from the traffic channel at regular intervals of time. The replaced voice packet is delayed and transmitted at the next allocated time slot. The added load due to signaling traffic is offset by the silence intervals in voice conversation, which are not transmitted in packetized voice communication.

34 Claims, 3 Drawing Sheets

METHOD AND APPARATUS FOR DEMAND-ASSIGNED REDUCED-RATE OUT-OF-BAND SIGNALING CHANNEL

This application is a continuation of prior application Ser. No. 08/177,025 filed Jan. 4, 1994, now abandoned.

TECHNICAL FIELD

This invention relates generally to radio frequency communications systems and, in particular, to a radio frequency communications system which transmits packetized information over a plurality of time slots on radio frequency channels.

BACKGROUND OF THE INVENTION

In the context of, for example, a global satellite cellular communications system, the available channel resources are limited. Such channels must typically carry not only information, such as voice or user data, but also signaling messages to set up and control a user-initiated call, message, or page. In the prior art it is known to assign one of these channels initially to set up a call, which may take up to a minute or longer to accomplish. After this, such channel is used to transmit the user information. This has the disadvantage of tying up a scarce resource during the call setup period. This is inefficient, particularly when it turns out that the call that has been set up cannot even proceed due to blocking at the other end.

Therefore, there is a substantial need for a method and apparatus for transmitting signaling messages over channel resources while minimizing the usage of such channel resources for this purpose.

SUMMARY OF INVENTION

Generally, the present invention provides a method and apparatus for preempting time slots for signaling information.

This is accomplished by providing a set of channels which are logically defined and multiplexed onto the voice traffic channels by stealing a voice packet from the traffic channel at regular intervals of time. The replaced voice packet is then simply delayed (by a voice packet duration at the source rate, e.g. 90 ms) and is transmitted at the next allocated slot on the L Band. (The L Band is the portion of the radio frequency spectrum which is used for the satellite link with the subscriber unit.) The added load due to this signaling traffic is offset by the silence intervals in voice conversation, because the silence intervals are not transmitted in packetized voice communication.

The frequency of stealing space from the voice channels, that is the recurrence interval of the superimposed signaling channel on the voice-allocated time slot, can generally be designed to eliminate any noticeable effect on voice quality, with proper packet delay equalization implemented at the receiving end of the voice channel. In this way, the present invention implements the signaling channels by using available space on the voice channels, so that no extra bandwidth is wasted in transmitting signaling messages.

According to one aspect of the invention, there is provided a method for efficient utilization of radio channel resources in a communication system, wherein a sequence of time slots is provided on each of the radio channel resources for packetized communications, the method comprising the steps of: preempting, on at least one of the radio channel resources, packetized information contained within at least one time slot of the sequence of time slots every N time slots to produce at least one preempted time slot; and utilizing the at least one preempted time slot for transmitting or receiving signaling information.

According to another aspect of the invention, there is provided a method for efficient utilization of radio channel resources in a satellite cellular communication system, wherein a sequence of time slots is provided on each of the radio channel resources for packetized communications, the method comprising the steps of: preempting, on at least one of the radio channel resources, packetized information contained within at least one time slot of the sequence of time slots every N time slots to produce at least one preempted time slot; and utilizing the at least one preempted time slot for transmitting or receiving signaling information.

According to yet another aspect of the invention, there is also provided a method for a subscriber unit to utilize a preempted time slot, the method comprising the steps of: monitoring a broadcast channel to determine the preempted time slot; upon determining the preempted time slot, determining whether the preempted time slot is allocated to the subscriber unit; if the preempted time slot is allocated to the subscriber unit, utilizing the preempted time slot; and if the preempted time slot is not allocated to the subscriber unit, ignoring the contents of the preempted time slot.

According to another aspect of the invention, there is provided apparatus for efficient utilization of radio channel resources in a communication system, wherein a sequence of time slots is provided on each of the radio channel resources for packetized communications, the apparatus comprising: means for preempting, on at least one of the radio channel resources, packetized information contained within at least one time slot of the sequence of time slots every N time slots to produce at least one preempted time slot; and means for utilizing the at least one preempted time slot for transmitting or receiving signaling information.

According to still another aspect of the invention, there is provided a subscriber unit for utilizing a preempted time slot comprising: a broadcast channel monitor for determining the preempted time slot and whether the time slot is allocated to the subscriber unit; and a preempted time slot processor, operably coupled to the broadcast channel monitor, that utilizes the preempted time slot if the preempted time slot is allocated to the subscriber unit, and that ignores the contents of the preempted time slot if the preempted time slot is not allocated to the subscriber unit.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF A PREFERRED EMBODIMENT

Figure 1:
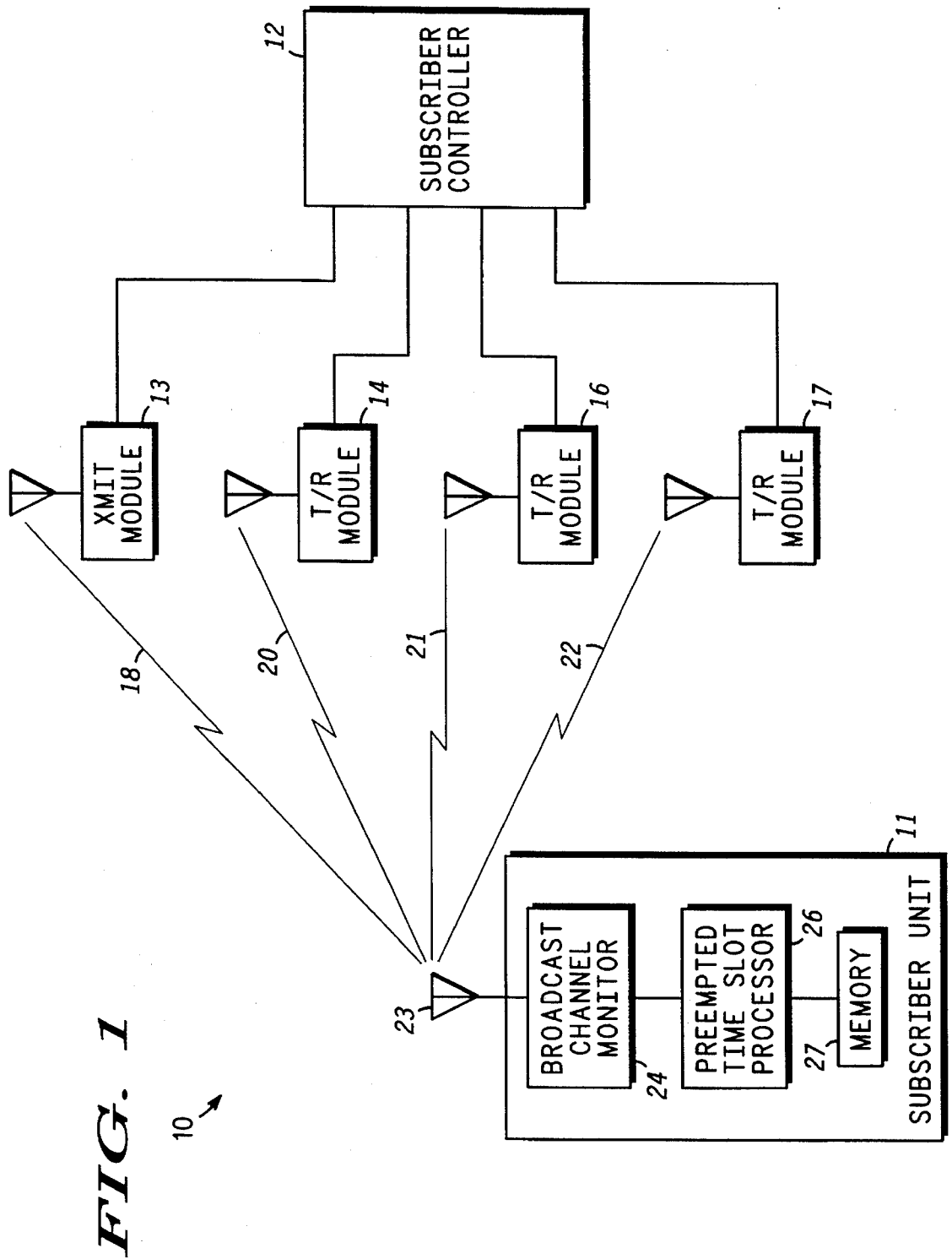
FIG. 1 shows a block diagram of a communication system that includes a plurality of subscriber units (only one shown) that communicate packetized information via radio channel resources.

FIG. 1 shows a communication system 10 that includes a plurality of individual subscriber units (ISUs), of which only one 11 is shown, that communicate packetized information via radio channel resources 20–22. The radio channels 20–22 are transceived via transmit/receive modules 14–17 which are coupled to a subscriber controller 12.

The subscriber unit 11 further comprises an antenna 23 that is coupled to a broadcast channel monitor 24 for receiving information transmitted on a broadcast channel 18 by transmit module 13 which is coupled to subscriber controller 12. The broadcast channel 18 carries system resource allocation information, such as the location/cell i.d. and the channels being allocated to the subscriber area being served. Modules 13–17 may be contained within a space vehicle (SV) (not illustrated) orbiting the earth.

The subscriber unit 11 further includes a preempted time slot processor 26 that is coupled to the broadcast channel monitor 24 and to memory 27.

Communication within the communication system 10 begins when a subscriber desires to place a call using ISU 11. When the subscriber decides to place a call, ISU 11 first listens to the broadcast channel 18 to determine the identity of a set of acquisition channels provided in the subscriber's location. The acquisition channels operate in the Aloha collision mode and are used by the subscriber's ISU 11 to request a signaling channel from the SV in its line of sight.

In the Aloha protocol a number of radio channels are made accessible to a number of resources who can independently try to use them, and if two or more users simultaneously attempt to use the same channel, a collision takes place and each user has to back up and retry after a random wait time.

After successfully transmitting its request to the SV, the SV assigns one of the available signaling channels to the ISU 11.

The SV notifies the ISU 11 of the assigned signaling channel by sending the information on the broadcast channel which the ISU 11 continues to monitor following its transmission of the channel request on the Aloha-operated acquisition channel. In Aloha mode, the acquisition channel is the channel which is used initially to communicate with the SV, and it requests a signaling or traffic channel.

The ISU 11 then uses the assigned signaling channel to send its call-signaling messages (call setup messages) until all the network elements involved in processing the call have processed the messages and indicated that the call can be set up.

The SV then assigns at that point a traffic channel (TCH) to the ISU 11. A traffic channel carries the user's information, whether voice or data.

The SV uses the signaling channel previously assigned to transmit the identity of the assigned traffic channel. At this point, the ISU 11 transmits an acknowledgment to the SV on the signaling channel and the SV then releases the signaling channel for use by other call attempters.

Figure 2:
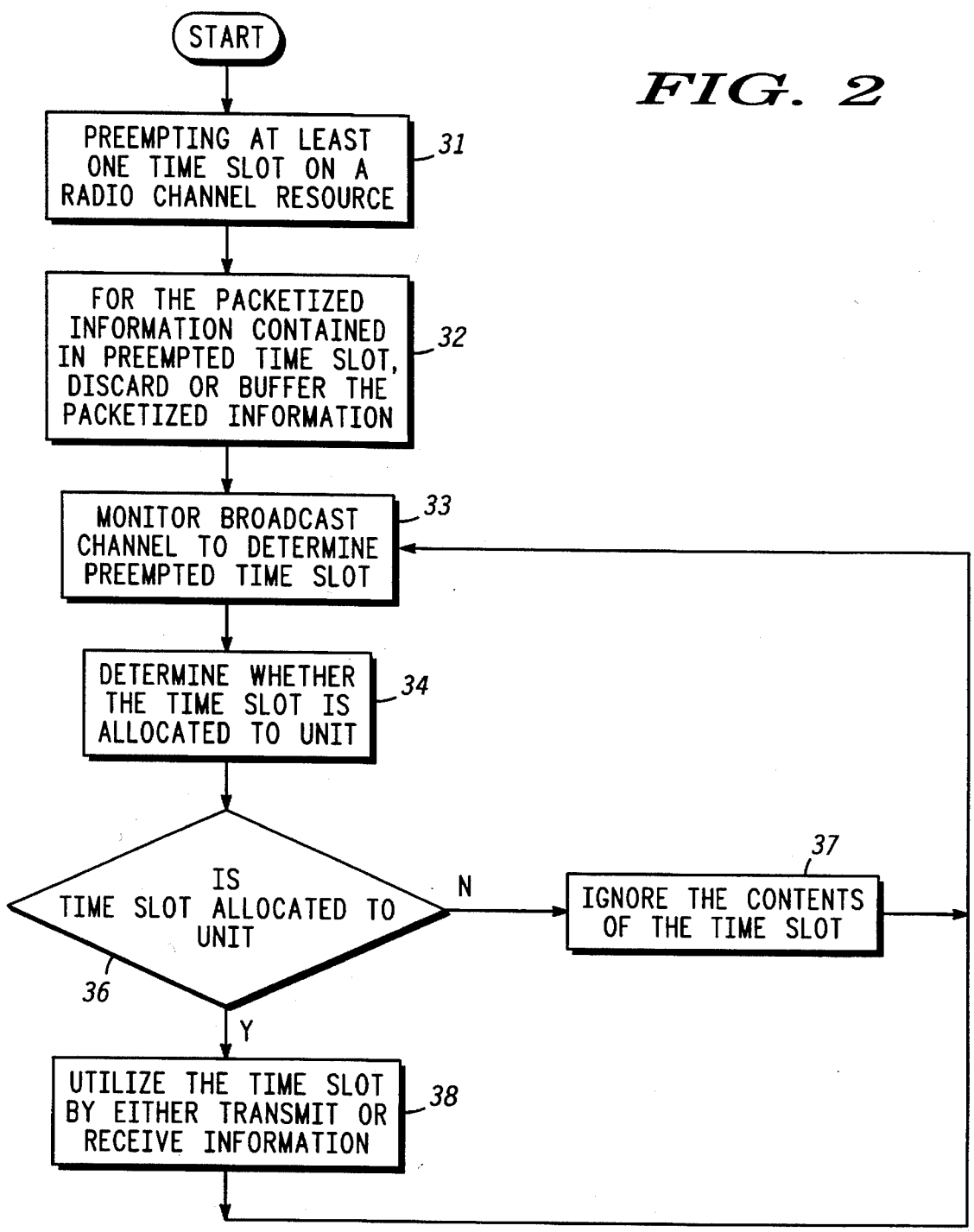
FIG. 2 is a flow diagram which illustrates the operation of a method of implementing a preferred embodiment of the present invention.

FIG. 2 is a flow diagram which illustrates the operation of a method of implementing a preferred embodiment of the present invention.

In the present invention the traffic channels are organized into, say, n blocks of B frequency channels each. Each frequency channel is divided into a number of time slots (refer to FIG. 3) which may be either of fixed or variable duration. In a preferred embodiment, each time slot defines a traffic channel and is used to carry one packet (90 milliseconds worth of compressed digitized voice data) which is then transmitted at a bit rate of 50 kilobits/second on the assigned voice traffic slot within the frame.

Then a signaling channel can be provided in each frequency block by stealing (preempting) the voice time slot (in the uplink and downlink) every, say, Tp*90 ms (Tp is an integer), but each time on a different consecutive frequency channel within the block until it hops through all of the frequencies in the block, at which point it repeats its hopping over the same sequence of frequencies within the block and so forth.

The parameters n and Tp are design parameters and can be set to obtain the desired signaling channel bandwidth (capacity), and an acceptable stealing period from the voice time slot channel.

In FIG. 2, the method begins in step 31 by preempting at least one time slot on a radio channel resource. The information packet (voice or data) is replaced with signaling information. The location of the preempted time slot is stored in memory 27.

In step 32 the replaced voice packet is temporarily buffered within the ISU or the SV for a period of 90 ms until it is transmitted at the next recurrence of the traffic channel time slot. This should not cause any problem as long as the block size, B, is properly set to limit the total number of the interrupted voice packets during a talkspurt. (In the simplest case, B may be set to 1 in which case no frequency groupings are necessary; that is, n is set to the number of RF carriers assigned for voice traffic.)

This defines a total of k * n signaling channels (where k is the number of Time Division Multiplex (TDM) voice channels defined on a single voice RF carrier) recurring every Tp frames. The silence following the talkspurt in packetized voice communication should then compensate for the stolen channel capacity during the talkspurt. Simple delay equalization is applied at the input to the receiving vocoder.

In step 33 the ISU monitors the broadcast channel to determine the time slot cycle preallocated for the signaling channel. For example, if time slot #2 is allocated on every other 10 frames, this information is indicated in the broadcast channel, as described above regarding FIG. 1.

In step 34, in order to identify the stolen time slots (assigned to provide signaling channels) on every traffic channel to the ISUs, and make them avoid transmitting or receiving voice on those time slots, the method requires the time slots on the successive voice frames be numbered (each voice frame in a preferred embodiment provides 4 uplink/downlink slots, whereas each pair of uplink/downlink slots make up a single traffic channel).

This is done by the SV by periodically transmitting a frame initialization message (which simply indicates the start of frame counts to the ISUs, that is frame number 0) through the control field associated with the voice frame. This helps the ISUs to keep track of the frame numbers (identities) as they are received (downlinked). Then, either on a priority basis or through messaging on the control field, the slot numbers assigned to the signaling channels are conveyed to the ISUs.

In decision box 36 a determination is made whether this time slot is allocated to this unit. If so, the method proceeds to step 38, but if not, it proceeds to step 37.

In step 37, once the signaling channels are identified to the ISUs in the manner explained above regarding step 34, the ISUs are inhibited from transmitting or receiving any voice information through them (they just skip or discard those slots unless one is assigned to the ISU for transmitting/receiving signaling messages to/from the SV).

As shown in step 38, an additional utilization of the signaling time slots (channels) may be in providing integrated voice and low rate data services. For instance, the signaling time slot on the assigned traffic channel to an ISU can also be assigned to the same ISU and maintained during its call and be utilized for transmitting low rate data services (such as a data sheet) while he/she is conversing with his/her party.

Figure 3:
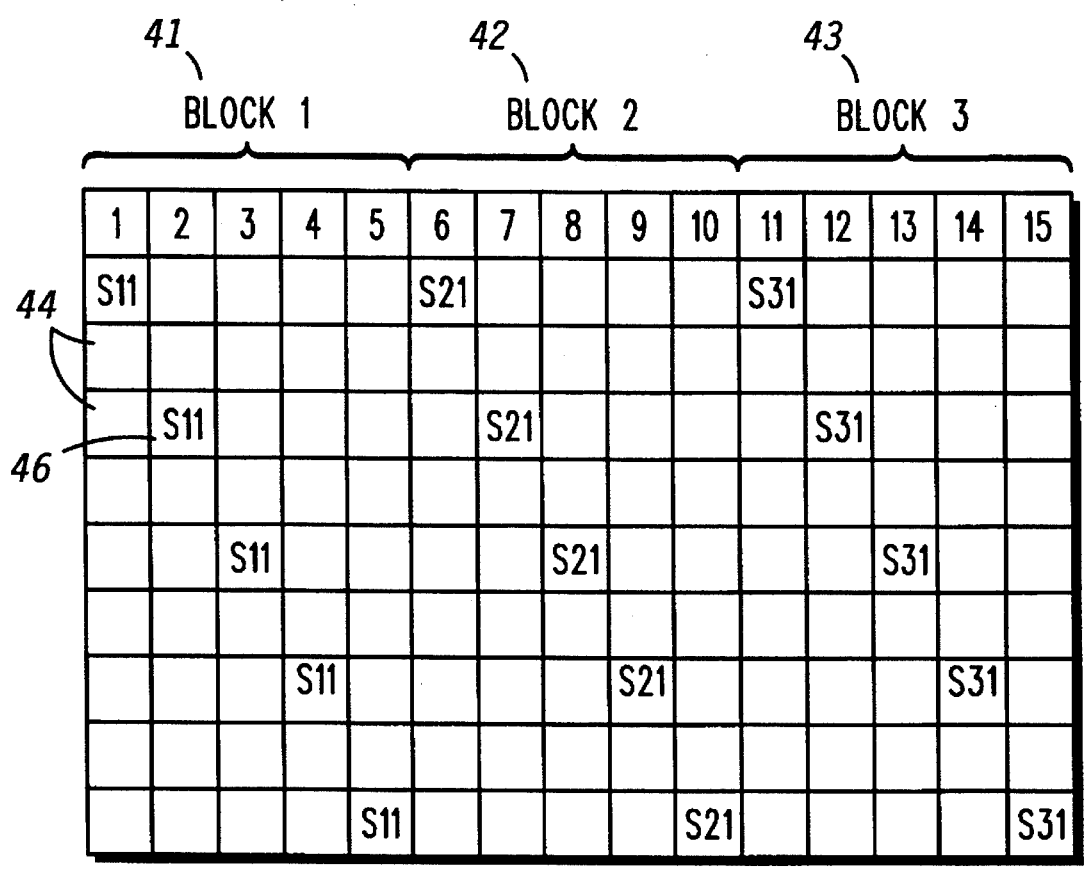
FIG. 3 illustrates how the signaling channels are implemented in a fifteen channel communication system that has the channels divided into three blocks 41–43.

FIG. 3 illustrates how the signaling channels are implemented in a fifteen channel communication system that has the channels divided into three blocks 41–43. Each channel includes a plurality of time slots 44 and at least one preempted time slot 46.

For this implementation, the general method for designing signaling channels is based upon a total of 15 radio-frequency (RF) carriers available for voice, and a block size of 5 (i.e., B=5) with a signaling channel period of 2 frames (that is, the signaling channel recurs once every 2*90 ms). This results in a stealing period of 10 frames (900 ms) from the voice time slots (channels). This implementation thus provides a total of 3 signaling channels (labeled S11, S21, and S31 in FIG. 3), on each voice traffic channel (a voice traffic channel comprises a frequency carrier and one of four uplink/downlink time slots carried through a 90 ms frame on the carrier frequency).

Moreover, the time slots need not all be of the equal duration but may be of variable duration.

It will be noted that the implementation of signaling channels is even more simplified when the amount of signaling channel bandwidth required is small enough to allow the derivation of a sufficient number of signaling channels without the use of frequency grouping. That means that the signaling channels will each occupy only one voice RF channel (i.e., no frequency jumps are made) dedicated to that signaling channel.

System Performance

It is estimated that the herein-disclosed method and apparatus can provide adequate bandwidth for handling the call control signaling messages on a large-capacity network global cellular system without any significant effect to at least 99% of the voice calls on the network.

Let us assume that there are about nine messages that need to be sent in each direction on the L Band between the ISU and the SV in the call setup phase following the acquisition process. Almost all of these messages are anticipated to take a single packet, except the call setup message which can take about two packets for voice, and possibly more for some data services. The call setup time is anticipated to take anywhere from 30 seconds to 1 minute to complete.

With a signaling period of Tp=12*90 ms=1.08 seconds (a period of 12 L Band frames is chosen for implementation simplicity purposes), nearly 27 (=30/1.08) signaling packets can be transmitted during just 30 seconds of the call setup time which is about 3 times the number of estimated signaling packets and is therefore more than adequate to even account for any required re-transmissions on the L Band.

The 1.08 signaling period in this simplified case (i.e., no frequency grouping) would result in stealing from voice a frame once every 1.08 seconds or 1.2/1.08 =1.1 frames per average voice talkspurt. This level of backlogged (postponed) voice frames can be then flushed out by the extra bandwidth provided by the silence intervals which have an average duration of around 1.3 seconds (the 1.3 seconds silence provides for the transmission of 14.4 voice packets, which is more than adequate to transmit the 1.11 packets postponed over the active period).

Note that in the simplified implementation, although a signaling channel can be implemented on every voice channel in the system (the one-to-one correspondence provided when no frequency grouping is used), this may not be necessary. Because of the much smaller call setup time (compared to the duration of the voice conversation lasting typically from 2.5 to 5 minutes), the number of signaling channels required can be much smaller than the total number of voice traffic channels in a cell. This means that a limited number of signaling channels may be implemented to reduce the maintenance and channel management required in actual practice. Thus, only a small subset of the voice traffic channels in a cell may be needed to provide an adequate number of signaling channels.

Generally a call may be blocked in any of three phases of call establishment. These are at 1) acquisition, 2) call setup signaling, due to unavailability of a signaling channel, and 3) at traffic channel assignment time in the call setup phase, due to the unavailability of a voice traffic channel.

Performance evaluations indicate the criticality of efficient channel usage in busy areas when a sufficient number of channels cannot be assigned to satisfy the demand for call attempt, particularly when a good fraction of those call attempts do not succeed due to inadequate Public Switched Telecommunications Network (PSTN) resources. This is when the advantages of the present invention become evident, because it provides call setup channels by stealing time slots on the voice traffic channels and does not occupy any bandwidth or channel that could otherwise have been used by a successful call.

Ordinarily the call blocking at the call setup phase should be about the same as call blocking at the channel assignment phase. There is no need to let call signaling proceed if no traffic channels will be available for it at the final phase of the call setup; likewise, a call setup process should be allowed to enter the system if there are going to be traffic channels available for the call.

It is not necessary for efficient optimum design to provide a signaling channel on every voice channel in the system. That is, the signaling channels may only be implemented on a small subset of the traffic channels and still meet the performance specified or achievable for call blocking at the traffic channel assignment phase.

SUMMARY

Thus it will be apparent that this invention has the following advantages. First, power is saved in the SV, because signaling channels normally operate at higher power to compensate for fading on the L Band. Secondly, the SV workload for the management of the signaling channels, such as the movement of channels between cells, synchronization, etc., is reduced in the above-described simplified implementation.

Thirdly, the buffering requirements within the SV (for buffering the replaced voice frames) is reduced in the implementation wherein a subset of traffic channels is used to derive the required number of signaling channels. Fourth, the present invention provides new opportunities for reducing the fraction of voice calls (less than 1%) which may possibly suffer further delays as a result of the delayed frames replaced by the signaling channels. One possibility would be to, for instance, assign the signaling-imbedded traffic channels only to those calls with short routes, while assigning the signaling-free channels to longer routed calls.

In general, the invention provides efficient utilization of the scarce radio channel resources by deriving the signaling channels from a free ride on the traffic channels, taking advantage of the overall extra bandwidth effectively provided by the pauses in packetized voice communications.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for efficient utilization of radio channel resources in a communication system, wherein a sequence of time slots is provided on each of the radio channel resources for packetized communications, the method comprising the steps of:

a) preempting, on at least one of the radio channel resources, packetized information contained within at least one time slot of said sequence of time slots every N time slots to produce at least one preempted time slot;

b) utilizing the at least one preempted time slot for transmitting or receiving signaling information, the signaling information being superimposed on the at least one preempted time slot; and c) indicating a location of the preempted time slot using an independent broadcast channel, the independent broadcast channel allowing the communication system to distinguish the signaling information from the packetized information.

2. The method of claim 1 wherein the time slots of a first channel of the radio channel resources are staggered in time from a second channel of the radio channel resources.

3. The method of claim 1 wherein the step of utilizing the at least one preempted time slot for transmitting signaling information further comprises utilizing signaling information by a subscriber unit or a subscriber controller.

4. The method of claim 1 wherein said packetized information comprises digitized voice information.

5. The method of claim 1 wherein the step of utilizing the at least one preempted time slot comprises transmitting or receiving data.

6. The method of claim 1 wherein the step of preempting comprises the step of preempting packetized information wherein said at least one preempted time slot has a variable duration.

7. The method of claim 1 wherein the step of preempting the time slot comprises buffering the packetized information for later transmission.

8. The method of claim 1 wherein the step of preempting the time slot comprises discarding the packetized information.

9. A method for efficient utilization of radio channel resources in a satellite cellular communication system, wherein a sequence of time slots is provided on each of the radio channel resources for packetized communications, the method comprising the steps of:

a) preempting, on at least one of the radio channel resources, packetized information contained within at least one time slot of said sequence of time slots every N time slots to produce at least one preempted time slot;

b) utilizing the at least one preempted time slot for transmitting or receiving signaling information, the signaling information being superimposed on the at least one preempted time slot; and c) indicating a location of the preempted time slot using an independent broadcast channel, the independent broadcast channel allowing the communication system to distinguish the signaling information from the packetized information.

10. The method of claim 9 wherein the time slots of a first channel of the radio channel resources are staggered in time from a second channel of the radio channel resources.

11. The method of claim 9 wherein the step of utilizing the at least one preempted time slot for transmitting signaling information further comprises utilizing signaling information by a subscriber unit or a subscriber controller.

12. The method of claim 9 wherein said packetized information comprises digitized voice information.

13. The method of claim 9 wherein the step of utilizing the at least one preempted time slot comprises transmitting or receiving data.

14. The method of claim 9 wherein the step of preempting comprises the step of preempting packetized information wherein said at least one preempted time slot has a variable duration.

15. The method of claim 9 wherein the step of preempting the time slot comprises buffering the packetized information for later transmission.

16. The method of claim 9 wherein the step of preempting the time slot comprises discarding the packetized information.

17. A method for a subscriber unit to utilize a preempted time slot of a radio channel in a communication system, the radio channel containing packetized information, and the preempted time slot having signaling information superimposed therein, the method comprising the steps of:

a) monitoring an independent broadcast channel to determine a location of the preempted time slot, the independent broadcast channel allowing the subscriber unit to distinguish the signaling information in the radio channel from the packetized information;

b) upon determining the location of the preempted time slot, determining whether the preempted time slot is allocated to the subscriber unit;

c) if the preempted time slot is allocated to the subscriber unit, utilizing the preempted time slot; and d) if the preempted time slot is not allocated to the subscriber unit, ignoring the contents of the preempted time slot.

18. The method of claim 17 wherein step (d) further comprises preventing the subscriber unit from transmitting.

19. The method of claim 17 wherein step (a) further comprises determining the time slot location within a periodic frame.

20. The method of claim 17 wherein step (c) further comprises utilizing the preempted time slot to receive or transmit information.

21. Apparatus for efficient utilization of radio channel resources in a communication system, wherein a sequence of time slots is provided on each of the radio channel resources for packetized communications, said apparatus comprising:

a) means for preempting, on at least one of the radio channel resources, packetized information contained within at least one time slot of said sequence of time slots every N time slots to produce at least one preempted time slot;

b) means for utilizing the at least one preempted time slot for transmitting or receiving signaling information, the signaling information being superimposed on the at least one preempted time slot; and c) means for indicating a location of the preempted time slot using an independent broadcast channel, the independent broadcast channel allowing the communication system to distinguish the signaling information from the packetized information.

22. The apparatus of claim 21 wherein the time slots of a first channel of the radio channel resources are staggered in time from a second channel of the radio channel resources.

23. The apparatus of claim 21 wherein the means for utilizing the at least one preempted time slot for transmitting signaling information further comprises means for utilizing signaling information by a subscriber unit or a subscriber controller.

24. The apparatus of claim 21 wherein said packetized information comprises digitized voice information.

25. The apparatus of claim 21 wherein said means for utilizing the at least one preempted time slot comprises means for transmitting or receiving data.

26. The apparatus of claim 21 wherein the means for preempting the time slot operates upon time slots of variable duration.

27. The apparatus of claim 21 wherein the means for preempting the time slot comprises means for buffering the packetized information for later transmission.

28. The apparatus of claim 21 wherein the means for preempting the time slot comprises means for discarding the packetized information.

29. A subscriber unit for utilizing a preempted time slot for transmitting or receiving signaling information, the signaling information being superimposed on the preempted time slot, the subscriber unit comprising:

a) a broadcast channel monitor for monitoring an independent broadcast channel indicating a location of the preempted time slot and whether the time slot is allocated to the subscriber unit; and b) a preempted time slot processor, operably coupled to the broadcast channel monitor, that utilizes the location of the preempted time slot if the preempted time slot is allocated to the subscriber unit for distinguishing the signaling information, and that ignores the contents of the preempted time slot if the preempted time slot is not allocated to the subscriber unit.

30. The subscriber unit of claim 29 wherein the preempted time slot processor further comprises means for inhibiting transmission if the preempted time slot is not allocated to the subscriber unit.

31. The subscriber unit of claim 29 wherein the subscriber unit further comprises means for determining the preempted time slot location within a periodic frame.

32. The subscriber unit of claim 31 wherein the subscriber unit further comprises a memory that stores the location of the preempted time slot.

33. The subscriber unit of claim 29 wherein the subscriber unit further comprises means for processing the contents of the preempted time slot.

34. The subscriber unit of claim 29 wherein the subscriber unit further comprises means for utilizing the preempted time slot to receive or transmit information.

* * * * *